United States Patent [19]

Eyrisch et al.

[11] Patent Number: 5,811,385

[45] Date of Patent: Sep. 22, 1998

[54] HIGH-CONCENTRATION AQUEOUS ESTER QUAT SOLUTIONS

[76] Inventors: Oliver Eyrisch; Günther Hertel, both of Hoechst Aktiengesellschaft, D-65926 Frankfurt am Main, Germany

[21] Appl. No.: 835,843

[22] Filed: Apr. 23, 1997

[30] Foreign Application Priority Data

Apr. 25, 1996 [DE] Germany ............... 196 16 482.6

[51] Int. Cl.$^6$ .............................................. C11D 1/62
[52] U.S. Cl. ................................................. 510/433
[58] Field of Search ............................ 510/433, 504, 510/522, 527

[56] References Cited

U.S. PATENT DOCUMENTS

| | | | |
|---|---|---|---|
| 4,789,491 | 12/1988 | Chang et al. | 252/8.75 |
| 5,066,414 | 11/1991 | Chang | 252/8.8 |
| 5,116,520 | 5/1992 | Lichtenwalter et al. | 252/8.6 |
| 5,427,696 | 6/1995 | Phan et al. | 252/8.6 |
| 5,447,644 | 9/1995 | Guenin et al. | 252/8.6 |

FOREIGN PATENT DOCUMENTS

| | | |
|---|---|---|
| 1312619 | 1/1993 | Canada . |
| 246133 | 9/1987 | Czechoslovakia . |
| 264073 | 1/1990 | Czechoslovakia . |
| WO 97/31888 | 2/1997 | WIPO . |

OTHER PUBLICATIONS

Devinsky, F., Masarova, L., Lacko, I., Mlynarcik, D., Journal of biopharmaceutical Sciences 1991, 2(1), 1–10, Jan. 1991.

Primary Examiner—Douglas J. McGinty
Assistant Examiner—John R. Hardee
Attorney, Agent, or Firm—Connolly & Hutz

[57] ABSTRACT

The ester quat solutions described contain at least 70% by weight, based on the solution, of at least one ester quat compound of the formula below

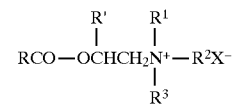

where RCO is an aliphatic acyl radical having 6 to 22 carbon atoms, R' is H or a $C_1$ to $C_{22}$ alkyl radical, $R^1$ is a methyl or ethyl radical, $R^2$ is a $C_1$ to $C_8$ alkyl radical, $R^3$ is a $C_3$ to $C_8$ alkyl radical and $X^-$ is a halide, alkyl carbonate, alkyl phosphate or an alkyl sulfate, where alkyl is methyl or ethyl. They are prepared by quaternizing corresponding carboxylic acid alkanolamine esters with, preferably, methyl chloride or dimethyl sulfate. The aqueous solutions described are advantageously suitable for preparing laundry detergents and cosmetics.

9 Claims, No Drawings

HIGH-CONCENTRATION AQUEOUS ESTER QUAT SOLUTIONS

DESCRIPTION

The invention relates to high-concentration aqueous solutions of quaternary carboxylic acid alkanolamine ester salts, a process for preparing these solutions and their use.

Quaternary carboxylic acid alkanolamine ester salts, also named ester quats, are highly active cationic surfactants with many uses. Thus, these surfactants are suitable, for example, as fabric softeners, cosmetic bases, active compounds with respect to soil release and soil redeposition, antistatic agents, fabric finishes, biocide and phase-transfer catalysts. Since these ester quats, owing to their biodegradability, are also ecologically advantageous, they have recently substantially replaced the classic fatty alkyl quats such as distearyldimethylammonium chloride.

For several of said areas of application and, likewise, with respect to storage, packaging and transport, high-concentration aqueous compositions of ester quats are desired. This requires ester quat compounds which are highly soluble in water, since even the high-concentration solutions should still be readily flowable and possess a low viscosity at room temperature (15° to 35° C.).

CA-A-1 312 619 describes quaternary ester amines which are obtained as concentrated solutions in isopropanol by esterifying alkanolamines with glycerides and quaternizing (alkylating) the esterification product with an alkyl halide or alkyl sulfate (compare Examples 1 to 5). However, these solutions still have the disadvantage that the ester quat compound is not present as such, but contains a more or less large amount of glyceride or partial glyceride, and that in the case of very high concentrations, their flowability at room temperature is insufficient.

CS-B-246 133 and CS-B-264 073 describe the preparation of pastes of ethanolamine ester sulfates in the presence of water. It is asserted that, in contrast with the prior art, i.e. tetraalkylammonium compounds, no dispersions or gels occur.

Aqueous compositions of ester quat compounds have now been found which, even at a very high active compound content (at room temperature or, if appropriate, elevated temperatures), are not pasty, but liquid and readily flowable. The aqueous solutions according to the invention feature a content of at least 70% by weight, based on the solution, of at least one ester quat compound of the formula (1) below

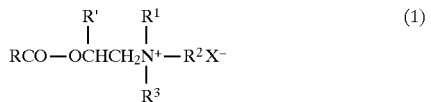

where

RCO is an aliphatic acyl radical having 6 to 22 carbon atoms,

R' is a hydrogen atom or a $C_1$ to $C_{22}$ alkyl radical, $R^1$ is a methyl or ethyl radical, $R^2$ is a $C_1$ to $C_8$ alkyl radical, $R^3$ is a $C_3$ to $C_8$ alkyl radical and $X^-$ is a halide, methyl carbonate or ethyl carbonate, methyl phosphate or ethyl phosphate or a methyl sulfate or ethyl sulfate.

Preferred ester quats of the formula (1) are those where RCO is an aliphatic acyl radical having 8 to 18 carbon atoms, R' is H or $CH_3$, preferably H, $R^1$ is $CH_3$, $R^2$ is a $C_1$ to $C_4$ alkyl radical and $R^3$ is a $C_3$ or $C_4$ alkyl radical and $X^-$ is halide or methyl sulfate (methosulfate), preferably halide.

Particularly preferred ester quats of the formula (1) have proved to be those where RCO is an aliphatic acyl radical having 8 to 18 carbon atoms, R' is H and $X^-$ is $Cl^-$ or $CH_3OSO_3^-$, preferably $Cl^-$, and $R^1$, $R^2$ and $R^3$ are the following alkyl radicals:

$R^1$ methyl, $R^2$ methyl, $R^3$ propyl (ester quat 1a),
$R^1$ methyl, $R^2$ methyl, $R^3$ butyl (ester quat 1b),
$R^1$ methyl, $R^2$ propyl, $R^3$ propyl (ester quat 1c) and
$R^1$ methyl, $R^2$ butyl, $R^3$ butyl (ester quat 1d).

The alkyl radicals mentioned for R', $R^1$, $R^2$ and $R^3$ can be unbranched or branched, unbranched being preferred. The aliphatic acyl radical is preferably a fatty acyl radical having said number of carbon atoms. It can be saturated or unsaturated (preferably mono-unsaturated to tri-unsaturated). Examples which may be mentioned are the acyl radicals of caprylic acid, capric acid, lauric acid, palmitic acid, stearic acid and oleic acid, and also coconut fatty acyl, tallow fatty acyl, preferably hardened tallow fatty acyl, and the like. The fatty acid radical is frequently a mixture of two or more acyl groups, for example $C_{12}$ and $C_{14}$ acyl ($C_{12/14}$), $C_{16}$ and $C_{18}$ acyl ($C_{16/18}$) or $C_{12}$ to $C_{18}$ acyl ($C_{12-18}$).

Preferred solutions according to the invention essentially comprise a) 70 to 98% by weight, preferably 80 to 95% by weight, of at least one compound of the formula (1) and b) water in an amount to make 100% by weight, percentages by weight based on the solution.

Other preferred solutions according to the invention essentially comprise a) 81 to 98% by weight, preferably 85 to 95% by weight, of at least one compound of the formula (1), where RCO, R', $R^1$, $R^2$ and $R^3$ have the specified meanings and $X^-$ is a methyl sulfate or ethyl sulfate, and b) water in an amount to make 100% by weight, percentages by weight based on the solution.

The ester quat solutions according to the invention are prepared by quaternizing (alkylating) carboxylic acid alkanolamine ester compounds of the formula (2) below

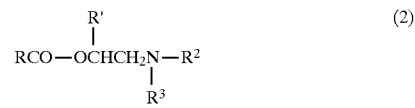

where RCO, R', $R^2$ and $R^3$ have the specified meanings, with a quaternizing agent corresponding to the anion $X^-$ in formula (1), preferably with methyl chloride or dimethyl sulfate, in the absence of solvent or in the presence of water.

According to a preferred procedure, the esterification is carried out in a first step and the resulting esterification product is then quaternized. A preferred process according to the invention therefore comprises a) esterifying an alkanolamine compound of the formula (3) below

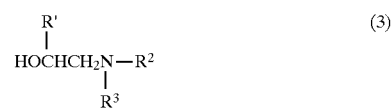

where R', $R^2$ and $R^3$ have the specified meanings, with a carboxylic acid of the formula (4) below

where RCO has the specified meaning, in the absence of solvent to give the carboxylic acid alkanolamine ester compound and b) quaternizing as described above the esterification product obtained in step a).

The process according to the invention is described in detail below: the specific alkanolamines of the formula (3) or alkanolamine esters of the formula (2) to be used are given by the meanings specified for R', $R^2$, $R^3$ and RCO under formula (1). The same applies to the carboxylic acid (fatty acid) to be used of the formula (4). The reaction of alkanolamine compound and carboxylic acid to give the ester compound is carried out in the absence of organic or other solvents. The temperature of the esterification reaction is 100° to 250° C., preferably 130° to 200° C. The reaction components, alkanolamine of formula (3) and carboxylic acid of the formula (4), are used in a molar ratio of 0.8 to 1.2 mol of carboxylic acid, preferably 1 to 1.05 mol of carboxylic acid, per mole of alkanolamine. Esterification catalysts can be used to accelerate the esterification reaction. Preference is given to acid catalysts, to be precise hydrohalic acids such as hydrochloric acid; phosphorus acids such as hypophosphorous acid or orthophosphoric acid; sulfuric acid and sulfonic acids such as methanesulfonic acid, paratoluenesulfonic acid or dodecylbenzenesulfonic acid. Preference is given to phosphorus acids and sulfonic acids. The amount of acid catalyst is generally 0.05 to 0.5% by weight, based on the weight of the alkanolamine used. Depending on the reaction temperature and type of reaction components, the reaction is carried out at atmospheric pressure or under the pressure which is established. It is preferred to maintain an inert gas atmosphere, for example a nitrogen atmosphere, during the reaction. It is further preferred to remove the reaction water from the reaction mixture, for example using an inert gas stream and/or vacuum. The esterification reaction is expediently followed by gas-chromatographic analysis or by determining the acid number. The reaction time is generally in the range of from 5 to 15 hours. The resulting esterification product, which is washed with water if appropriate, is liquid to waxy at room temperature and essentially comprises the target carboxylic acid alkanolamine ester compound according to formula (2).

The quaternization reaction of the process according to the invention is preferably carried out on the ester amine product obtained by the above described esterification reaction. Ester amine products, obtained in other ways or commercially available, of the formula (2) can also be used. The quaternization can be carried out in the absence of solvent or in the presence of water as solvent, a temperature of 40° to 150° C., preferably 50° to 100° C., being advantageous. The water is used in an amount such that, after the quaternization, the above-specified high-concentration aqueous solutions are present. In the case of the solvent-free variant, the appropriate amount of water is added at the end of the reaction. The alkyl halide, as alkylating agent, is used in an amount such that a pressure of at most 10 bar is present, preferably 2 to 8 bar. The other (liquid) alkylating agents, such as dimethyl sulfate, are used in an amount of 0.8 to 1 mol, preferably 1 mol, per mole of ester amine. It is expedient to follow the quaternization reaction by continuous determination of the degree of quaternization. The reaction time is generally 5 to 15 hours.

The process according to the invention can be carried out either batchwise or else continuously. The continuous procedure is preferably carried out in at least two, preferably two to three, stirred tanks arranged in a cascade. It is advantageous here to feed ester amine and alkylating agent continuously to the first tank after a conversion rate of ester amine and alkylating agent of about 10 to 30 mol %, based on ester amine, is achieved, and to set the residence time of the product mixture in the stirred tanks such that the product from the last tank has the desired degree of quaternization. The high-concentration compositions according to the invention are not pasty, gel-like or dispersion-like, but rather, frequently even at room temperature, liquid, low-viscous and therefore readily flowable (pourable) clear products.

The ester quat solutions according to the invention which have a very high active compound content are advantageously suitable anywhere where cationic surfactants are desired, for example in all fields of application mentioned at the outset. Their use according to the invention is preferably in the preparation of laundry detergents and cosmetics. The high-concentration aqueous ester quat mixtures are also advantageously suitable for preparing solid formulations, by subjecting them to conventional manufacturing processes for conversion into solid form such as powder, pellets, granules and the like. Processes of this type are, for example, agglomeration or spray-drying. If appropriate, processing aids can be used for the manufacturing.

The invention is now described in more detail on the basis of examples and comparison examples.

EXAMPLE 1

Aqueous solutions of N,N-dioctyl-N-methyl-[-1-oxododecyl(tetradecyl)oxyethyl]ammonium chloride [the expression "oxododecyl(tetradecyl)" means a mixture of $C_{12}$ and $C_{14}$ acyl radicals] having an active compound content of 70% by weight, 80% by weight and 90% by weight (percentages by weight based on the solution) are prepared by stirring the (molten) ester quat compound according to the invention into the appropriate amount of water at 70° C. The three high-concentration mixtures are examined visually at 25° C. and 70° C. with regard to their appearance and physical state.

Result: All mixtures have a clear appearance and are readily pourable.

EXAMPLE 2

The ester quat compound according to the invention N,N-dibutyl-N-methyl-[-1-oxododecyl(tetradecyl)oxyethyl] ammonium methosulfate according to the invention is used and treated as in Example 1.

Result: All mixtures have a clear appearance and are readily pourable.

EXAMPLE 3

Aqueous solutions of N,N-dibutyl-N-methyl-[1-oxododecyl(tetradecyl)oxyethyl] ammonium chloride having an active compound content of 80% by weight, 90% by weight and 95% by weight are prepared by stirring the ester quat compound according to the invention into the appropriate amount of water at 70° C. The three high-concentration mixtures are examined visually at 25° C. and 70° C. regarding their appearance and physical state.

Result: All mixtures have a clear appearance and are readily pourable.

EXAMPLE 4

An aqueous solution of N,N-diisopropyl-N-methyl-[1-oxododecyl(tetradecyl)oxyethyl] ammonium methosulfate having an active compound content of 90% by weight is prepared by stirring the ester quat compound according to the invention into the appropriate amount of water at 70° C. The high-concentration mixture is examined visually at 70° C. regarding its appearance and physical state.

Result: The mixture has a clear appearance and is readily pourable.

EXAMPLE 5

The ester quat compound according to the invention N,N-dipropyl-N-methyl-[1-oxododecyl(tetradecyl)-oxyethyl] ammonium methosulfate is used and treated as in Example 4.

Result: The mixture has a clear appearance and is readily pourable.

EXAMPLE 6

Aqueous solutions of N,N-dipropyl-N-methyl-[1-oxododecyl(tetradecyl)oxyethyl] ammonium chloride having an active compound content of 80% by weight and 90% by weight are prepared by stirring the ester quat compound according to the invention into the appropriate amount of water at 70° C. The two high-concentration mixtures are examined visually at 25° C. and 70° C. regarding their appearance and physical state.

Result: The 90% by weight strength mixture has, at 25° C. and 70° C., a clear appearance and is readily pourable; the 80% by weight strength mixture has, at 70° C., a clear appearance and is readily pourable.

EXAMPLE 7

Aqueous solutions of N-butyl-N,N-dimethyl-[1-oxododecyl(tetradecyl)oxyethyl] ammonium methosulfate having an active compound content of 80% by weight and 90% by weight are prepared by stirring the ester quat compound according to the invention into the appropriate amount of water at 70° C. The two high-concentration mixtures are examined visually at 70° C. regarding their appearance and physical state: They have a clear appearance and are readily pourable.

EXAMPLE 8

Aqueous solutions of N-butyl-N,N-dimethyl-[1-oxododecyl(tetradecyl)oxyethyl] ammonium chloride having an active compound content of 70% by weight and 80% by weight are prepared by stirring the ester quat compound according to the invention into the appropriate amount of water at 70° C. The 70% by weight strength solution is, at 70° C., clear and readily pourable, and the 80% by weight strength solution is clear and readily pourable at 25° and 70° C.

COMPARISON EXAMPLE 1

Aqueous solutions of N,N,N-trimethyl-[1-oxododecyl (tetradecyl)oxyethyl] ammonium chloride having an active compound content of 70% by weight, 80% by weight and 90% by weight (percentages by weight based on the solution) are prepared by stirring the ester quat compound into the appropriate amount of water at 70° C. The three high-concentration mixtures are examined visually at 25° C. and 70° C. regarding their appearance and physical state.

Result: All mixtures are solid (non-pourable).

COMPARISON EXAMPLE 2

The ester quat compound N,N-diethyl-N-methyl-[1-oxododecyl (tetradecyl) oxyethyl] ammonium chloride is used and treated as in Comparison Example 1.

Result: All mixtures are solid (non-pourable).

We claim:

1. A high-concentration aqueous solution which features a content of at least 70% by weight, based on the solution, of at least one ester quat compound of the formula (1) below

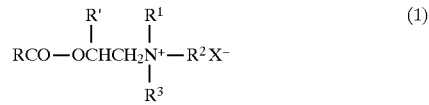

where

RCO is an aliphatic acyl radical having 6 to 22 carbon atoms,

R' is a hydrogen atom or a $C_1$ to $C_{22}$ alkyl radical, $R^1$ is a methyl or ethyl radical, $R^2$ is a $C_1$ to $C_8$ alkyl radical, $R^3$ is a $C_3$ to $C_8$ alkyl radical and $X^-$ is a halide, methyl carbonate or ethyl carbonate, methyl phosphate or ethyl phosphate or a methyl sulfate or ethyl sulfate.

2. A solution as claimed in claim 1, wherein, in formula (1), RCO is an aliphatic acyl radical having 8 to 18 carbon atoms, R' is H or $CH_3$, $R^1$ is $CH_3$, $R^2$ is a $C_1$ to $C_4$ alkyl radical, $R^3$ is a $C_3$ or $C_4$ alkyl radical and $X^-$ is a halide or methyl sulfate.

3. A solution as claimed in claim 1, wherein, in formula (1), RCO is an aliphatic acyl radical having 8 to 18 carbon atoms, R' is H, $X^-$ is $Cl^-$ or $CH_3OSO_3^-$ and $R^1$, $R^2$ and $R^3$ are the following alkyl radicals:

$R^1$ methyl, $R^2$ methyl, $R^3$ propyl, $R^1$ methyl, $R^2$ methyl, $R^3$ butyl, $R^1$ methyl, $R^2$ propyl, $R^3$ propyl or $R^1$ methyl, $R^2$ butyl, $R^3$ butyl.

4. A solution as claimed in claim 1, comprising
   a) 70 to 98% by weight of at least one compound of the formula (1) as claimed in claim 1 and
   b) water in an amount to make 100% by weight, percentages by weight based on the solution.

5. A solution as claimed in claim 2, comprising
   a) 70 to 98% by weight of at least one compound of the formula (1) as claimed in claim 2 and
   b) water in an amount to make 100% by weight, percentages by weight based on the solution.

6. A solution as claimed in claim 3, comprising
   a) 70 to 98% by weight of at least one compound of the formula (1) as claimed in claim 3 and
   b) water in an amount to make 100% by weight, percentages by weight based on the solution.

7. A solution as claimed in claim 1, comprising
   a) 81 to 98% by weight of at least one compound of the formula (1), where RCO, R', $R^1$, $R^2$ and $R^3$ have the specified meanings and $X^-$ is a methyl sulfate or ethyl sulfate, and b) water in an amount to make 100% by weight, percentages by weight based on the solution.

8. A solution as claimed in claim 1, comprising
a) 81 to 98% by weight of at least one compound of the formula (1), where RCO is an aliphatic acyl radical having 8 to 18 carbon atoms, R' is H or $CH_3$, $R^1$ is $CH_3$, $R^2$ is a $C_1$ to $C_4$ alkyl radical, $R^3$ is a $C_3$ or $C_4$ alkyl radical and $X^-$ is a methyl sulfate, and
b) water in an amount to make 100% by weight, percentages by weight based on the solution.

9. A process for preparing the solutions as claimed in claim 1, which comprises quaternizing carboxylic acid alkanolamine ester compounds of the formula (2) below $$\underset{R^3}{\underset{|}{RCO-OCHCH_2N}}\overset{R'}{\overset{|}{-}}R^2 \qquad (2)$$

where RCO, R', $R^2$ and $R^3$ have the specified meanings,
with a quaternizing agent corresponding to the anion $X^-$ in formula (1) in the absence of solvent or in the presence of water.

* * * * *